(12) United States Patent
Wnuk et al.

(10) Patent No.: US 11,188,786 B2
(45) Date of Patent: Nov. 30, 2021

(54) INVARIANT-BASED DIMENSIONAL REDUCTION OF OBJECT RECOGNITION FEATURES, SYSTEMS AND METHODS

(71) Applicant: Nant Holdings IP, LLC, Culver City, CA (US)

(72) Inventors: Kamil Wnuk, Playa del Rey, CA (US); Jeremi Sudol, New York, NY (US); Bing Song, La Canada, CA (US); Matheen Siddiqui, Culver City, CA (US); David McKinnon, San Francisco, CA (US)

(73) Assignee: Nant Holdings IP, LLC, Culver City, CA (US)

( * ) Notice: Subject to any disclaimer, the term of this patent is extended or adjusted under 35 U.S.C. 154(b) by 121 days.

(21) Appl. No.: 16/538,800

(22) Filed: Aug. 12, 2019

(65) Prior Publication Data
US 2019/0362184 A1    Nov. 28, 2019

Related U.S. Application Data

(60) Division of application No. 15/706,600, filed on Sep. 15, 2017, now Pat. No. 10,410,088, which is a
(Continued)

(51) Int. Cl.
*G06K 9/62* (2006.01)
*G06K 9/46* (2006.01)

(52) U.S. Cl.
CPC ......... *G06K 9/6232* (2013.01); *G06K 9/4633* (2013.01); *G06K 9/4671* (2013.01); *G06K 9/623* (2013.01)

(58) Field of Classification Search
CPC ...... G06K 9/6232; G06K 9/4671; G06K 9/20; G06K 9/4633; G06T 7/2026;
(Continued)

(56) References Cited

U.S. PATENT DOCUMENTS 5,734,796 A    3/1998 Pao
6,343,267 B1   1/2002 Kuhn et al.
(Continued)

FOREIGN PATENT DOCUMENTS

CN    102708380 A    10/2012
WO    2010/149763 A    12/2010

OTHER PUBLICATIONS

Gemert et al: "Visual Word Ambiguity", IEEE, 2010 (Year: 2010).*
(Continued)

*Primary Examiner* — Ruiping Li
(74) *Attorney, Agent, or Firm* — Elaine K. Lee; Andrew A. Noble; Mauriel Kapouytian Woods LLP

(57) ABSTRACT

A sensor data processing system and method is described. Contemplated systems and methods derive a first recognition trait of an object from a first data set that represents the object in a first environmental state. A second recognition trait of the object is then derived from a second data set that represents the object in a second environmental state. The sensor data processing systems and methods then identifies a mapping of elements of the first and second recognition traits in a new representation space. The mapping of elements satisfies a variance criterion for corresponding elements, which allows the mapping to be used for object recognition. The sensor data processing systems and methods described herein provide new object recognition techniques that are computationally efficient and can be performed in real-time by the mobile phone technology that is currently available.

25 Claims, 8 Drawing Sheets

Related U.S. Application Data continuation of application No. 15/245,986, filed on Aug. 24, 2016, now Pat. No. 9,792,529, which is a continuation of application No. 14/626,706, filed on Feb. 19, 2015, now Pat. No. 9,460,366.

(60) Provisional application No. 61/941,989, filed on Feb. 19, 2014.

(58) Field of Classification Search
CPC ..... G06T 7/2033; G06T 7/208; G06T 7/2093; H04N 13/0239; H04N 13/0282
USPC ......................................................... 382/159
See application file for complete search history.

(56) References Cited

U.S. PATENT DOCUMENTS

| | | | |
|---|---|---|---|
| 6,735,589 | B2 | 5/2004 | Bradley et al. |
| 6,858,826 | B2 | 2/2005 | Mueller et al. |
| 6,907,412 | B2 | 6/2005 | Pao et al. |
| 6,954,212 | B2 | 10/2005 | Lyons et al. |
| 7,418,121 | B2 | 8/2008 | Kasai |
| 7,728,848 | B2 | 6/2010 | Petrov et al. |
| 7,949,158 | B2 | 5/2011 | Lee et al. |
| 8,111,889 | B2 | 2/2012 | Basu et al. |
| 8,285,019 | B2 | 10/2012 | Raundahl et al. |
| 8,285,074 | B2 | 10/2012 | Saund et al. |
| 8,306,280 | B2 | 11/2012 | Nozaki et al. |
| 8,515,193 | B1 | 8/2013 | Han et al. |
| 8,565,513 | B2 | 10/2013 | Shao et al. |
| 9,177,381 | B2 | 11/2015 | McKinnon |
| 9,460,366 | B2 | 10/2016 | Wnuk et al. |
| 9,792,529 | B2 | 10/2017 | Wnuk et al. |
| 10,410,088 | B2 | 9/2019 | Wnuk et al. |
| 2005/0169517 | A1 | 8/2005 | Kasai |
| 2006/0232583 | A1 | 10/2006 | Petrov et al. |
| 2008/0143724 | A1 | 6/2008 | Russakoff |
| 2009/0251557 | A1 | 10/2009 | Kim et al. |
| 2010/0020222 | A1 | 1/2010 | Jones et al. |
| 2011/0007072 | A1 | 1/2011 | Khan et al. |
| 2011/0052068 | A1 | 3/2011 | Cobb et al. |
| 2012/0299961 | A1* | 11/2012 | Ramkumar ........... G06T 19/006 345/632 |
| 2013/0188042 | A1 | 7/2013 | Brooksby et al. |
| 2014/0099082 | A1* | 4/2014 | Miller .................... H04N 5/93 386/285 |
| 2015/0261803 | A1 | 9/2015 | Song et al. |
| 2015/0262036 | A1 | 9/2015 | Song et al. |
| 2015/0324998 | A1 | 11/2015 | Song et al. |

OTHER PUBLICATIONS

13th Lab, www.13thlab.com, Feb. 3, 2014 (capture).
BlippAR.com, www.blippar.com, Nov. 3, 2013 (capture).
Ke et al., "PCA-SIFT: A More Distinctive Representation for Local Image Descriptors," CVPR'04 Proceedings of the 2004 IEEE computer society conference on Computer vision and pattern recognition, vol. 2, 10 pages.
Layar, www.layar.com, Feb. 1, 2014 (capture).
McWhertor, "DreamPlay App a New Leap in AR, Not Part of Disney Infinity Project, Say Creators," www.polygon.com/2013/1/9/3851974/disney-dreamplay-ar-app-disney, 8 pages.
Okatani et al., "Theory of Nuisance Parameter Problems in Computer Vision and Examples of Application for Linear Case," 7 pages.
Qualcomm Vuforia, www.qualcomm.com/products/vuforia, Feb. 9, 2015 (capture).
Soatto, "Actionable Information in Vision," 2009 IEEE 12th International Conference on Computer Science, 8 pages.
Vedaldi et al., "Efficient Additive Kernels via Explicit Feature Maps," IEEE Transactions on Pattern Analysis and Machine Intelligence, 2012, vol. 34, Issue 3, 14 pages.
Vedaldi, "Invariant Representations and Learning for Computer Vision," Doctoral Dissertation, University of California at Los Angeles, 2008, 215 pages.
International Search Report and Written Opinion issued in International Application No. PCT/US2015/016677 dated May 29, 2015, 13 pages.
International Preliminary Report on Patentability issued in International Application No. PCT/US2015/016677 dated Jun. 10, 2016, 18 pages.
Brown et al., "Automatic Panoramic Image Stitching Using Invariant Features," International Journal of Computer Vision, 2007, vol. 74, Issue 1, 16 pages.
Lowe, "Distinctive Image Features from Scale-Invariant Keypoints," International Journal of Computer Vision, 2004, vol. 60, Issue 2, 28 pages.
Office Action issued in Chinese Patent Application No. 201580020628.0 dated Jan. 17, 2019, 20 pages.
Office Action issued in Chinese Patent Application No. 201580020628.0 dated Jun. 5, 2019, 24 pages.

* cited by examiner

INVARIANT-BASED DIMENSIONAL REDUCTION OF OBJECT RECOGNITION FEATURES, SYSTEMS AND METHODS

This application is a division of U.S. application Ser. No. 15/706,600, filed Sep. 15, 2017, which is a continuation of U.S. application Ser. No. 15/245,986, filed Aug. 24, 2016, which is a continuation of U.S. application Ser. No. 14/626,706, filed Feb. 19, 2015; now U.S. Pat. No. 9,460,366, and claims priority to U.S. provisional application 61/941,989, filed Feb. 19, 2014. These and all other extrinsic references contained herein are hereby incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is object recognition technology.

BACKGROUND

The following description includes information that may be useful in understanding the present invention. It is not an admission that any of the information provided herein is prior art or relevant to the presently claimed invention, or that any publication specifically or implicitly referenced is prior art.

Consumers continue to experience an increasingly blurred distinction between real-world and on-line interactions. With the advent of object recognition technologies available today, consumers can now virtually interact with real-world objects through their smart phones and other mobile electronic devices. For example, consumers can capture an image of a movie poster via their cell phones. In response, the cell phone can construct an augmented reality interaction or game overlaid on the display of the cell phone. In fact, the Applicants have pioneered such technologies through their iD® technologies as implemented by DreamPlay™ (see URL www.polygon.com/2013/1/9/3851974/disney-dreamplay-ar-app-disney-infinity) Other technologies that attempt to offer similar experiences include the following:

Layar® (see URL www.layar.com),
BlippAR.com™ (see URL www.blippar.com), and
13th Lab (see URL www.13thlab.com).

Unfortunately, such technologies are limited in scope and typically are only capable of recognizing a single object at a time (e.g., a single toy, a single person, a single graphic image, etc.). In addition, a consumer must position their cell phone into a correct position or orientation with respect to the object of interest, then wait for their the cell phone to analyze the image information before engaging content is retrieved. Ideally a consumer should be able to engage content associated with an object of interest very quickly and should be able to engage many objects at the same time. The above referenced companies fail to provide such features.

Objects represented in image data can be recognized through descriptors derived from the image data. Example descriptors include those generated from algorithms such as SIFT, FAST, DAISY, or other pattern identification algorithms. Some descriptors can be considered to represent a multi-dimensional data object, a vector or a histogram for example. However, the dimensions of the descriptor do not necessarily have equivalent object discriminating capabilities. Principle Component Analysis (PCA) can provide for statistical identification of which descriptor dimensions are most important for representing a training set of data. Unfortunately, PCA fails to provide insight into the discriminative power of each dimension or identifying which dimension of the descriptor would have greater discriminating power with respect to an environmental parameter (e.g., lighting, focal length, depth of field, etc.). As such, each dimension has to be processed in every instance to determine discriminating features.

U.S. Pat. No. 5,734,796 "Self-Organization of Pattern Data With Dimensional Reduction Through Learning of Non-Linear Variance-Constrained Mapping" issued to Pao, filed Sep. 29, 1995, provides systems and methods for visualizing a large body of multi-featured pattern data (e.g., chemical characteristic information) in a computationally efficient manner. The process involves subjecting the multi-featured pattern data to a nonlinear mapping from the original representation to one of reduced dimensions using a multilayer feed-forward neural net. While advantageous in some regards, Pao fails to appreciate that data can be acquired in a controlled environment under different conditions to empirically identify dimensions that can be reduced or ignored.

U.S. Pat. No. 6,343,267 "Dimensionality Reduction For Speaker Normalization and Speaker and Environment Adaptation Using Eigenvoice Techniques" issued to Kuhn et al., filed Sep. 4, 1998, describes techniques for speaker normalization in the context of speech recognition by an initially speaker-independent recognition system. The technique enables the speaker-independent recognition system to quickly reach a performance level of a speaker-dependent system without requiring large amounts of training data. The technique includes a one-time computationally intensive step to analyze a large collection of speaker model data using dimensionality reduction. Thereafter, a computationally inexpensive operation can be used for a new speaker to produce an adaptation model for the new speaker. Like Pao, Kuhn fails to appreciate that data can be acquired in a controlled environment under different conditions to empirically identify dimensions that can be ignored.

Some references contemplate controlling a data acquisition environment within the context of imaging and image analysis. For example, U.S. Pat. No. 7,418,121 "Medical Image Processing Apparatus and Medical Image Processing System" issued to Kasai, filed Dec. 10, 2004, describes a medical diagnostic imaging processing system that updates its training data by customizing a detection condition. The purpose of updating the training data is to enhance the system's diagnostic capabilities within a specialized medical field. Kasai fails to describe modifying a detection condition to empirically identify dimensions within a data set that can be ignored to improve computational efficiency for image processing.

U.S. Pat. No. 8,565,513 "Image Processing Method For Providing Depth Information and Image Processing System Using the Same" issued to Shao et al., filed Dec. 8, 2009, describes a method of estimating a depth of a scene or object in a 2D image by capturing different view angles of scene or object. Shao fails to appreciate that different views of the object can be used to empirically identify image descriptors that are less relevant for image recognition processing.

In the publication "Actionable Information in Vision" by Soatto, published in *Proceedings of the International Conference on Computer Vision*, October 2009, (see URL vision.ucla.edu/publications.html), Soatto states that the data acquisition process can be controlled (which he refers to as "Controlled Sensing") to counteract the effect of nuisances. Soatto fails to discuss controlling the parameters and/or attributes of a data acquisition environment for the purposes of empirically identifying dimensions that can be reduced (e.g., ignored).

Object recognition techniques can be computationally expensive. The environments in which object recognition can be of most use to a user is often one in which the devices available for object capture and recognition have limited resources. Mobile devices, for example, often lack the computational capabilities of larger computers or servers, and network capabilities is often not fast enough to provide a suitable substitute. Thus, processing every dimension for discrimination with each execution of an object recognition technique can cause latency in execution, especially with multiple objects and/or in computationally weak computing devices. For certain applications, such as augmented reality gaming applications, this latency can render the application unusable. None of the references mentioned above provides an accurate and computationally inexpensive object recognition technique that involves empirically identifying dimensions that can be ignored. Thus, there is still a need to improve upon conventional object recognition techniques.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

SUMMARY OF THE INVENTION

The inventive subject matter provides apparatus, systems and methods in which a sensor data processing system provides object recognition capabilities without the need for intensive computations. The sensor data processing system includes a controlled sensing environment that has configurable environmental parameters (e.g., lighting, orientation of object, camera settings, focal length, resolution, depth of field, etc.). Each environmental parameter has one or more configurable attributes. For example, if the environmental parameter is lighting, the corresponding attribute(s) could be 100 lux, 2 meters from light source, 120 watt incandescent bulb, etc. The controlled sensing environment is available at object training time, but is not a requisite for the sensor data processing system to recognize objects when not training.

The sensor data processing system also includes an image processing engine. In one aspect of some embodiments, the image processing engine includes a processor that is functionally coupled with a non-transitory electronic storage medium and capable of executing a set of executable instructions (e.g., software code) stored therein. The executable instructions are configured to analyze sensor data (e.g., image signal) and recognize an object in the sensor data in a manner that requires minimal computational resources compared to known object recognition methods and systems. In another aspect of some embodiments, the executable instructions can be additionally configured to recognize objects in the sensor data in a scale invariant manner.

In further aspects of some embodiments, the executable instructions can be organized into modules that execute different steps or functions. In such embodiments, the image processing engine can include a trait recognition module that obtains a first training data set from a sensor. For example, the trait recognition module could receive a first image signal from a camera. The first training data set is representative of at least one object under a defined environmental state within the controlled environment. The trait recognition module is configured to derive a first recognition trait from the first training data set according to a trait extraction algorithm. The first recognition trait is representative of a plurality of elements that describe features or properties of the object.

Once the first recognition trait is derived, one or more of the environmental parameters and its corresponding environmental attributes in the controlled imaging environment can be adjusted or modified to create a new environmental state (e.g., a second environmental state). The adjustment can occur manually by a user or automatically by an environmental configuration module of the image processing engine.

The trait recognition module is configured to obtain a second training data set representative of the object under the new environmental state within the controlled environment. Using the second training data set, the trait recognition module can derive a new recognition trait according to the trait extraction algorithm. The new recognition trait is representative of a second plurality of elements that describe features or properties of the object in the new environmental state. Trait recognition module is also configured to derive or otherwise determine a correspondence between the first trait and the new trait.

The image processing engine also has a mapping module that is configured to identify a mapping that maps the elements of first recognition trait and the elements of the new recognition traits to a new representation space. The mapping identified by the mapping module satisfies trait element variance criteria among corresponding elements in the traits across the first and second training set. The mapping module can be further configured to store the mapping into a memory.

The methods and processes of the inventive subject matter can be employed to reduce the computational load associated with object recognition, and as such improve the quality and speed of the recognition itself without having to increase computing capacity, which in turn increases the viability of object recognition for applications in computationally-limited environments or that require minimal latency to properly function.

Various objects, features, aspects and advantages of the inventive subject matter will become more apparent from the following detailed description of preferred embodiments, along with the accompanying drawing figures in which like numerals represent like components.

DETAILED DESCRIPTION

Throughout the following discussion, numerous references will be made regarding servers, services, interfaces, engines, modules, clients, peers, portals, platforms, or other systems formed from computing devices. It should be appreciated that the use of such terms is deemed to represent one or more computing devices having at least one processor (e.g., ASIC, FPGA, DSP, x86, ARM, ColdFire, GPU, multi-core processors, etc.) configured to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, the Internet, LAN, WAN, VPN, or other type of packet switched network. One should appreciate that the present inventive subject matter provides numerous technical effects, such as systems and methods for three-dimensional object recognition.

As used herein, references to computing devices, modules, engines, processors and/or any other components being "configured to" and "programmed to" execute instructions to carry out steps and functions of the inventive subject matter are used interchangeably, and are intended to refer to one or more computing devices, processors, engines, modules or other hardware computing components having instructions loaded for execution.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figure 1A:
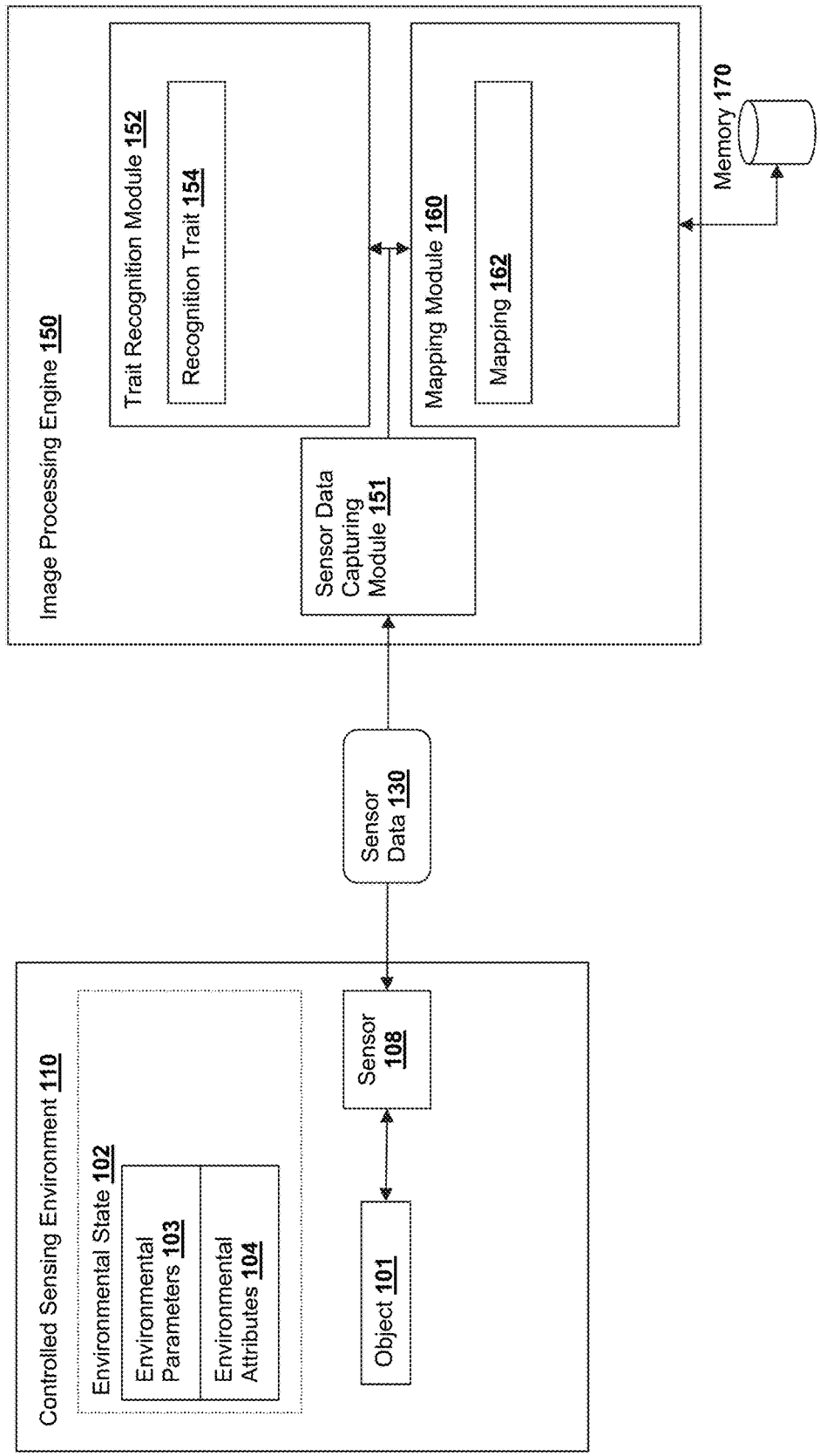
FIG. 1A is a schematic of a sensor data processing system.

FIG. 1A shows an overview of sensor data processing system 100. System 100 includes an image processing engine 150 communicatively coupled with one or more sensors 108, and programmed to receive sensor data 130 from one or more sensors 108 within a controlled sensing environment 110.

Controlled sensing environment 110 can be considered to be the environment within which the sensor 108 can sense, detect, or otherwise perceive an object 101. Controlled sensing environment 110 includes a plurality of controllable or adjustable environmental parameters 103. At least some of the environmental parameters 103 are capable of affecting how an object 101 within environment 110 is perceived or otherwise sensed by sensor(s) 108. Each environmental parameter 103 can have one or more environmental attribute 104 that further defines (provides a value for) the respective parameter.

Examples of environmental parameters 103 and corresponding attributes 104 include lighting properties such as type of light temperature (e.g., Kelvin measurements), light source (e.g., indoor lighting, outdoor lighting, incandescent, fluorescent, bulb wattage, etc), light intensity (e.g., lux measurements), lighting position with respect to object (e.g., above object, in front of object, etc.), light source distance from object, and light type (e.g., natural, window, flash, ambient, combinations thereof, light color, etc.). It is further contemplated that environmental parameters 103 can include time (e.g., a duration or length of time, sampling or analysis frequency, distortions of time via slowing down or speeding up sensor data playback, etc.). This allows for analysis of objects within an environment that are dynamic and change with time, such as with medical imaging of a heart beating.

Other examples of environmental parameters 103 and attributes 104 may include sensor modalities and/or sensor properties of sensor 108. For example, sensor 108 could comprise an image sensor (e.g., CCD sensor digital camera, CMOS sensor digital camera, thermal imager or infrared camera), audio transducer (e.g., microphone, acoustic resonant mass sensor, acoustic response measurements, acoustic properties, etc.), olfactory sensor, or any other sensor capable of producing unique data sets suitable for identifying an object. Because environmental parameters 103 and attribute 104 can include sensor modalities and/or properties, the controlled sensing environment 110 is not limited to the physical environment within which the object 101 resides but also extends to include the controlled parameters of the sensor 108 and other non-physical parameters that can affect the sensor 108.

When the sensor is an image sensor, such as a digital camera, examples of environmental parameters 103 and attributes 104 may include camera settings and properties such as aperture size (e.g., f/1.4, f/2, f/2.8, f/4, f/5.6, f/8, etc.), shutter speed or exposure time (e.g., 1/2000 sec, 1/250 sec, etc.), film sensitivity (e.g., ISO 100, ISO 400, ISO 3200, etc.), flash settings, resolution settings (e.g., 1.3 megapixel, 2.1 megapixel, 5.0 megapixel, etc.), video frame rate (e.g., 20 FPS, 30 FPS, 60 FPS, etc.), video aspect ratio (e.g., 4:3, 16:9, etc.), shooting mode (e.g. fully automatic, manual, aperture-priority, shutter-priority, etc.), camera type, and lens type.

When the sensor 108 is an audio sensor, environmental parameters can include sound volume, amplitude, sound absorption, pitch, duration, speech recognition parameters (e.g., patterns, tone, etc.), frequency, object movement direction, phase, etc.

Environmental parameters 103 and corresponding attributes 104 may also include data communication properties, such as communication type (e.g., wired, wireless, fiber optic cable, Ethernet cable, etc.), communication protocol (Bluetooth®, Wi-Fi®, TCP/IP, etc.), and communication signal integrity (e.g., signal strength, network latency, etc.). For wireless signals, environmental parameters 103 and their attributes 104 can also include aspects of the environment that might affect the transmission of the signals such as the size and number of objects within the environment (e.g., number of people in a room), shape of environment, materials present in the environment (including the materials of the objects within the environment), reflectivity, absorption, etc.

Other examples of environmental parameters 103 and associated attributes 104 can include weather properties (e.g., wind speed, humidity, % overcast, altitude, atmospheric pressure), gravity, magnetic field intensity, electrical field intensity, and other properties of a physical environment. In addition, environmental parameters 103 and attributes 104 can include object properties of object 101, such as shape, distance from sensor 108, orientation with respect to the sensor 108, field of view, surface reflectivity, texture, surface roughness, object color, object size, object opacity, object transparency, object translucency, heat emission, noise emission (e.g., volume, duration, etc.), or any other measureable attribute of the object. Environmental parameters 103 and attributes 104 can further include system-dependent error rates and error rates of trait extraction algorithms.

As can be appreciated by the astute reader, there are certain environmental parameters that are modality-specific and others that can affect sensors 108 of multiple types. As such, certain environmental parameters can be correlated with sensor data modality for adjustment (especially in multi-sensor environments covering a plurality of modalities). For example, lighting intensity will not affect an audio sensor. Similarly, unless of a magnitude to affect a camera via vibration, audio volume will not affect sensor data captured by an image sensor. However, an object orientation for an object that outputs audio (such as a speaker) within an environment can affect the perception of the object in both the visual (i.e., the object looks different because of its changed orientation relative to a camera) and audio (i.e., the sound is projected in a different direction and can affect how a microphone detects it, such as if the sound goes from being directed towards a microphone to being directed away from a microphone) modalities.

The examples of environmental parameters 103 and environmental attributes 104 mentioned above are not an exhaustive list and are merely provided for exemplary purposes. As seen from the examples above, environmental parameters 103 (and their corresponding environmental attributes 104) may include properties that are human sensible (e.g., lighting) and human non-sensible (e.g., signal strength, infrared lighting).

At any given time, a controlled sensing environment 110 will have an environmental state 102. Environmental state 102 is defined at least in part by environmental parameters 103 and environmental attributes 104. Environmental state 102 can be considered to be a state of an environment having at least some known, defined, or at least definable, environmental parameters 103 and attributes 104. Additionally, in embodiments, at least some of these known, defined or definable parameters 103 and/or attributes 104 can further be modified, controlled, adjusted or otherwise changed. In some instances, environmental state 102 can be representative of an expected environment state external to controlled sensing environment 110.

Object 101 is typically a physical real-world object having at least some characteristics or properties that can be sensed, detected or otherwise perceived by sensor 108. However, it is contemplated that the inventive subject matter can be applied to synthetic, computer-modeled environments. As such, the object 101 can be a virtual object within the computer-modeled environments. Within the modeled environments, sensors 108 can be simulations of real-world sensors within the virtual environment, such that they capture sensor data of the (virtual) object 101 in the same way a real-world corresponding sensor captures sensor data of the real-world environment being simulated. In embodiments, the sensors 108 can be real-world sensors capturing a virtual or simulated environment (such as a camera capturing imagery of a virtual environment with a virtual object shown via a display device).

As shown in FIG. 1A, image processing engine 150 includes a sensor data capturing module 151, a trait recognition module 152 and a mapping module 160. The image processing engine 150 can be embodied as computer-executable instructions stored on one or more non-transitory computer-readable memory that are executed by one or more processors to execute the functions and processes of the inventive subject matter. In embodiments, the image processing engine 150 can be one or more hardware processors specifically hard-coded to execute the functions and processes of the inventive subject matter.

The sensor data capturing module 151 is configured to obtain or otherwise receive sensor data 130 from one or more sensors 108. In general, sensor data set 130 is representative of an object 101 under the environmental conditions (i.e., the environmental state 102) within the controlled sensing environment 110 as perceived by sensor 108. Examples of sensor data sets 130 can include image data, video data, audio data, temperature data, barometric pressure data, wind speed data, humidity data, pressure sensor data, accelerometer data, biometrics, and any other type of sensor data generated by sensors (including sensor data corresponding to the example sensors mentioned herein).

After module 151 obtains sensor data set 130, trait recognition module 152 uses the sensor data set 130 to derive a recognition trait 154 according to a trait extraction algorithm. The trait extraction algorithm used by trait recognition module 152 can incorporate one or more classification algorithm, object recognition algorithm, and/or image processing algorithm. Examples of trait extraction algorithms include, but are not limited to: scale-invariant feature transform (SIFT), features from accelerated segment test (FAST), gradient location-orientation histogram (GLOH), (DAISY), binary robust independent elementary feature (BRIEF), oriented fast and rotated BRIEF (ORB), binary robust invariant scalable keypoints (BRISK), fast retina keypoint (FREAK), speed-up robust feature (SURF), visual simultaneous localization and mapping (vSLAM), simultaneous localization and mapping (SLAM), and based upon related sequence types (BURST). In some embodiments, the trait extraction algorithm may comprise an automatic speech recognition algorithm. Other suitable trait extraction algorithms and techniques include edge-based recognition techniques such as those described in Applicant's U.S. provisional application No. 61/989,445 titled "Image-Based Feature Detection Using Edge Vectors" and Applicant's U.S. patent application Ser. No. 14/623,341 titled "Edge-Based Recognition, Systems and Methods", both of which are incorporated by reference herein in their entirety.

Recognition trait 154 can be made up of one or more elements (e.g., sub-units of a trait). For example, in some embodiments, a recognition trait 154 can be an image descriptor such as a SIFT descriptor. The SIFT descriptor could have 128 dimensions, each dimension having a value. The one or more elements of recognition trait 154 could represent the values of the 128 dimensions of the SIFT descriptor.

In another aspect of some embodiments, a plurality of recognition traits can be a cluster or clusters of image descriptors (e.g., groups of descriptors that share some common feature or association). In some cases, the cluster(s) may represent a constellation(s) of descriptors within a descriptor space (e.g., 2D space, 3D space). In yet another aspect of some embodiments, the one or more elements may represent a descriptor location that indicates the location of a descriptor with respect to other descriptors within a descriptor space. The descriptor location could also be the location of a cluster of descriptors (e.g., for bag-of-features classification model). Descriptor clusters can be used to generate a trait vocabulary. The trait vocabulary is discussed in further detail below.

Figure 1B:
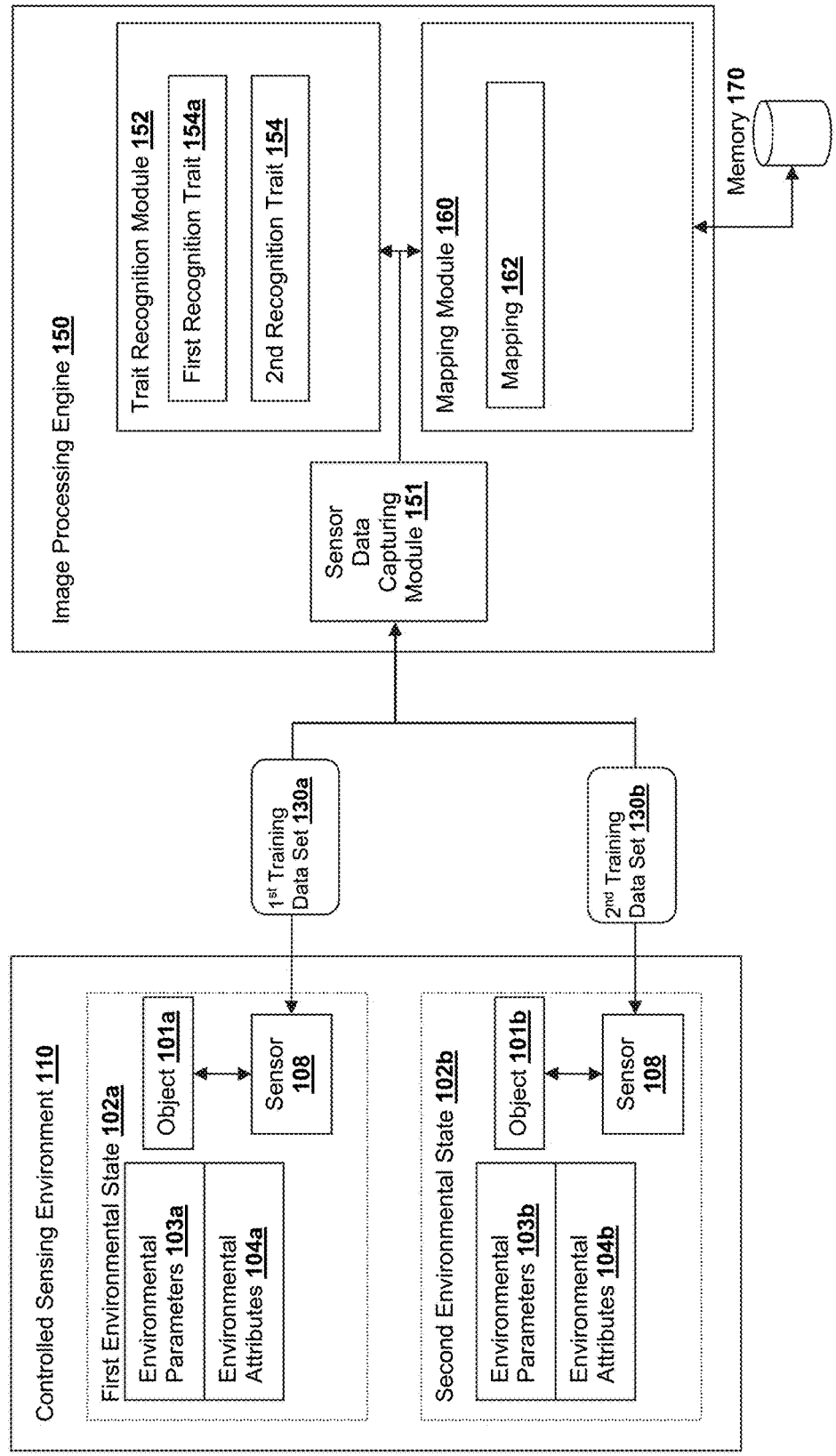
FIG. 1B is a schematic of the sensor data processing system of FIG. 1A illustrating multiple environmental states.

As discussed above in reference to FIG. 1A, the system 100 includes a controlled sensing environment 110 whose environmental state 102 is defined by the environmental parameters 103 and their corresponding environmental attributes 104. Thus, changes to the environmental parameters 103 and/or attributes 104 (e.g. the values) can be considered to define new environmental states 102. FIG. 1B provides an overview of the system 100 of FIG. 1A, illustrating two different environmental states 102a and 102b within controlled sensing environment 110 during the execution of functions and processes of the inventive subject matter.

As shown in FIG. 1B, the first and second environmental states 102a and 102b each include respective environmental parameters 103a and 103b with their respective corresponding environmental attributes 104a and 104b.

Environmental parameters 103a and 103b will generally be the same set of parameters, or at least include at least one common environmental parameter whose change can be monitored and/or controlled within the controlled sensing environment 110. Thus, the differences between environmental state 102a and 102b will be differences in one or more environmental attributes 104a and 104b for environmental parameters 103a, 103b that are common to both environmental states 102a, 102b.

FIG. 1B also illustrates objects 101a and 101b within environmental states 102a and 102b, respectively. Both objects 101a and 101b are the same physical object 101 from FIG. 1A. As the object 101 exists in different environmental conditions/states (and possible different temporal states), and as such, are perceived differently by sensor 108. In other words, object 101a can be considered to be the perception of the object 101 by sensor 108 under the environmental conditions of environmental state 102a and object 101b can be considered to be the perception of the object 101 by sensor 108 under the (different) environmental conditions of environmental state 102b.

Figure 2:
FIG. 2 is an image of an object in a first environmental state.

As illustrated in FIG. 1B, sensor data capturing module 151 first receives a set of sensory data 130, referred to as first training data set 130a. FIG. 2 illustrates one example of a first training data set 130a, namely, image 200. Image 200 is a photograph of an object 101a in an environmental state 102a. In this particular example, object 101 is a 3D toy figurine and object 101a is the 3D toy figurine 101 captured by the sensor 108 as shown in FIG. 2. As discussed, above, an environmental state 102 can be defined by many different parameters 103 and corresponding attributes 104, such as the lighting, background colors, background objects, orientation of an object 101 with respect to the camera 108, and so forth. For this illustrative example, the environmental parameters 103a (and associated environmental attributes 104a) of controlled sensing environment 110 for environmental state 102a are considered to be the lighting conditions (e.g., brightness) and the orientation of the figurine 101a relative to camera 108.

Figure 3A:
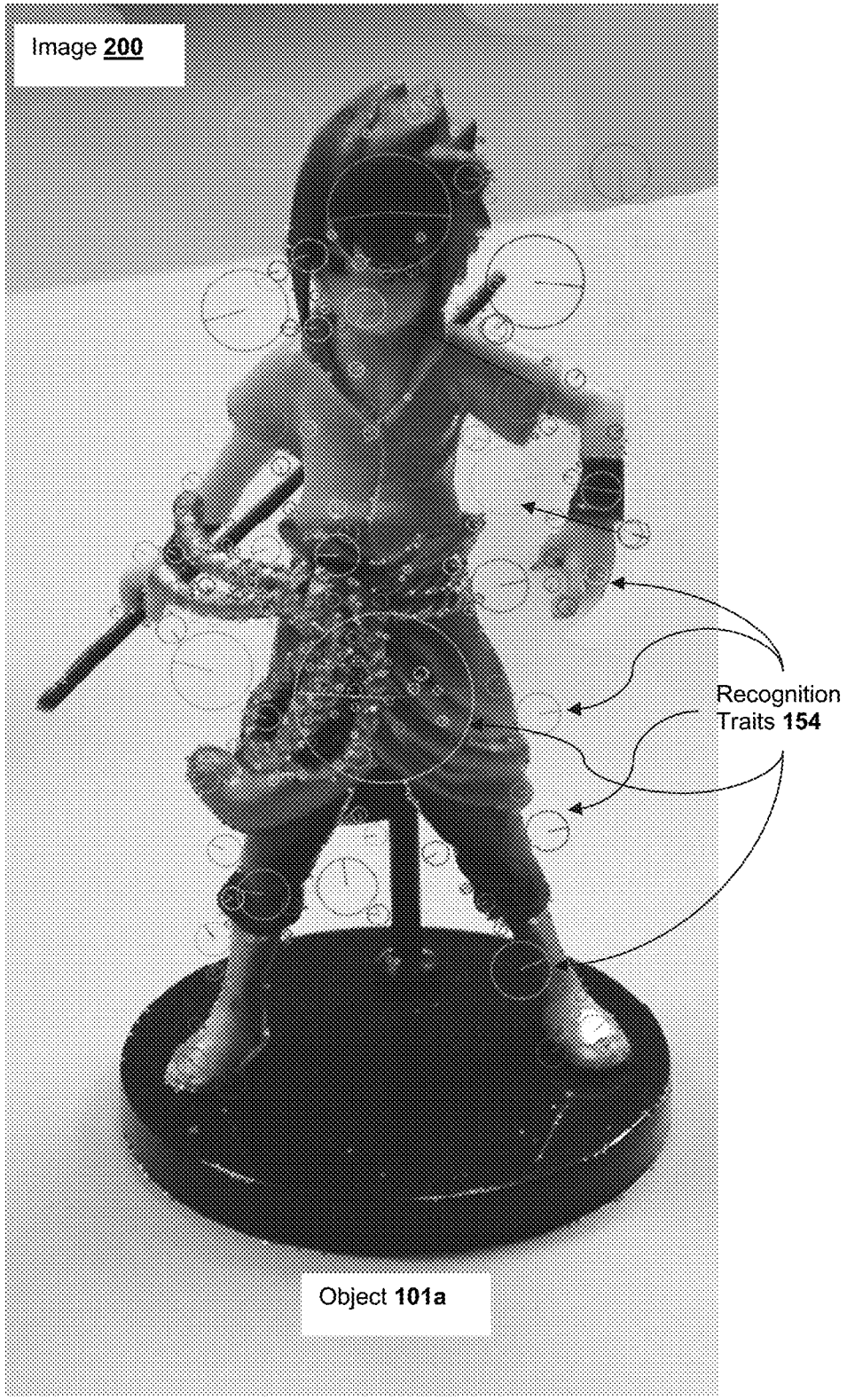
FIG. 3A is the image of FIG. 2 with recognition traits highlighted.

After module 151 obtains data set 130a, trait recognition module 152 uses data set 130a to derive a first recognition trait 154a according to a trait extraction algorithm, as discussed above. FIG. 3A illustrates image 200 having a plurality of recognition traits 154 identified on the figurine 101a by a trait extraction algorithm. In the example of FIG. 3A, the trait extraction algorithm used by trait extraction module 152 is SIFT. As such, the recognition traits 154 shown are SIFT keypoints (represented by a circle with a radial line indicating an orientation). One or more of these recognition traits 154 can be selected by the image processing engine 150 as first recognition trait(s) 154a. The selection of recognition traits as first recognition trait(s) 154a for use in processing can depend on the size of the descriptor, the orientation, or other characteristics of the recognition trait. In embodiments, the first recognition trait 154a can be user-selected, such as by clicking or otherwise highlighting the desired recognition trait 154 within the image 200. However, more interesting embodiments automatically process the traits.

Figure 3B:
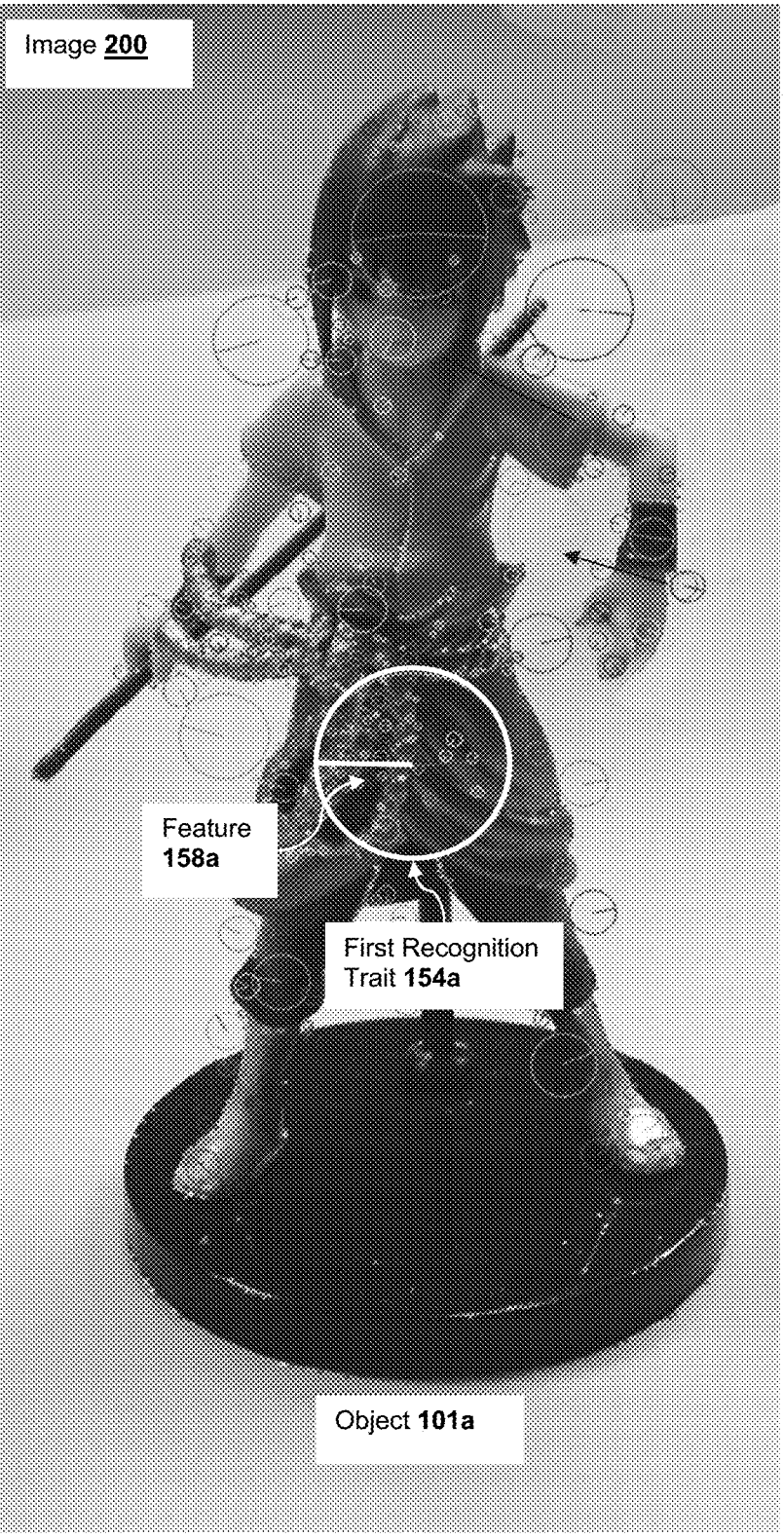
FIG. 3B is the image of FIG. 3A, with a first recognition trait highlighted.

FIG. 3B is a highlighted example of a first recognition trait 154a, which comprises one or more descriptive elements (e.g., descriptors) that fall on feature 158a (e.g., a rope belt on the figurine) of object 101a that have been derived from the trait extraction algorithm. Within the image 200, the keypoint of first recognition trait 154a is located at an (x, y) pixel location coordinate of the image. For this example, the keypoint of first recognition trait 154a is considered to be located at pixel location (376, 729) of image 200.

A descriptor as used in this example can be represented as a vector, which has a concrete, defined number of dimensions having a corresponding value (even if the value is zero). In the example of FIG. 3B, the descriptors used are a 128-dimension SIFT descriptors. As such, the descriptor of first recognition trait 154a resulting from the trait extraction module is considered to be {0, 0, 6, 24, 13, 33, 5, 0, 4, 7, 58, 81, 45, 128, 34, 17, 140, 67, 43, 4, 1, 6, 20, 140, 64, 14, 1, 0, 0, 0, 0, 41, 0, 0, 0, 1, 26, 40, 4, 0, 16, 6, 2, 7, 140, 140, 29, 13, 140, 27, 2, 3, 20, 10, 17, 93, 63, 14, 2, 0, 0, 0, 0, 21, 0, 0, 0, 10, 21, 3, 0, 0, 19, 1, 1, 25, 140, 51, 1, 7, 140, 14, 1, 1, 38, 17, 1, 50, 63, 9, 1, 0, 0, 0, 0, 21, 0, 0, 1, 3, 7, 7, 0, 0, 13, 4, 3, 17, 140, 42, 1, 2, 140, 55, 11, 3, 39, 6, 2, 22, 27, 20, 29, 0, 0, 0, 0, 6}.

Returning to FIG. 1B, once module 152 has derived the first recognition trait 154a, the second environmental state 102b is created by adjusting one or more of the environmental parameters 103 and environmental attributes 104 of controlled sensing environment 110. Second environmental state 102b is defined by environmental parameters 103b and corresponding environmental attributes 104b, at least one of which is different from one or more of the environmental parameters 103a and/or one or more of the corresponding environmental attributes 103 of environmental state 102a. In this illustrative example, the environmental parameters 103b remain the same as the environmental parameters 103a, and the environmental attributes 104b corresponding to lightning and orientation of the figurine 101 have been changed from the environmental attributes 104a. In other words, environmental state 102a differs from environmental state 102b in that the environmental attributes of the lighting environmental parameter 103 within the controlled sensing environment 110 and orientation environmental parameter 103 of object 101 relative to the camera 108 have been changed.

Figure 4:
FIG. 4 is an image of the object of FIG. 2 in a second environmental state.

The sensor data capturing module 151 then obtains or otherwise receives a second training data set 130b from sensor 108. The second training data set 130b is representative of object 101b in the second environmental state 102b. FIG. 4 illustrates one example of a second training data set 130b, namely, image 400. Image 400 is a photograph of an object 101b in an environmental state 102b. Object 101b is the same 3D toy figurine 101, which is depicted as object 101a in FIG. 2. However, object 101b is perceived by the camera 108 in a slightly different manner given that object 101b is in a different environmental state 102b. As can be seen in FIG. 4, environmental state 102b is different than state 102a in that the lighting condition is darker and the orientation of the figurine 101 has been rotated counter-clockwise about 45 degrees.

Using training data set 130b, trait recognition module 152 derives a second recognition trait 154b. In this particular instance, the second recognition trait 154b is one or more descriptors that fall on a feature 158b of object 101b, which have been derived using a trait extraction algorithm. Feature 158b corresponds to the same physical part of object 101 as feature 158a of FIG. 3B (the same part of the rope belt of the figurine).

Second recognition trait 154b has a correspondence to first recognition trait 154a in some manner, such as a physical or logical geometry. For example, since image 200 and image 400 are obtained in a controlled setting (e.g., controlled sensing environment 110), module 152 can determine the (x, y) coordinate for each trait 154a, 154b and assign a correspondence between traits having similar (x, y) coordinates, even though the two corresponding traits may have vastly different values. System 100 can use this correspondence to analyze for invariance among traits and/or trait elements by establishing commonalities or bases of reference between the different training data sets 130a and 130b.

Another example of correspondences can include a correspondence between traits located at the same physical location of object 101 across both environmental states 102a, 102b. If there are no changes in the relative orientation of the object 101 and sensor 108 (including no changes in zooming or other spatial distortion features of sensor 108), the traits 154a and 154b corresponding to a particular physical feature of object 101 will be in identical (or very similar) (x, y) pixel locations within two images corresponding to training sets 130a, 130b. If the relative orientation of the object 101 and sensor 108 changes between environmental states 102a and 102b, image recognition techniques can be used to track the movement of a particular physical feature of object 101 between the images. Examples of suitable image recognition techniques that can be used to correlate or track a physical feature between two different images include the techniques disclosed in Applicant's U.S. patent application Ser. No. 13/330,883 titled "Depth Estimation Determination, Systems and Methods", which is incorporated by reference herein in its entirety. It should be noted that, in certain controlled environments 110, models of object 101 can be generated and known ahead of time such that the trait recognition module 152 can employ the models to mirror the changes in the orientation of the object 101 relative to the sensor 108 and thus track the location of the same physical feature of the object 101 across multiple environmental states.

Other contemplated types of correspondences can include acoustic correspondences (e.g., such as to identify a same part of a spoken word spoken at different times), scaling factor correspondences, modalities of sensor data correspondences (e.g., modalities of image data such as infrared image, RGB image, etc.)

In embodiments, a correspondence between recognition traits can be one or more environmental parameters 103 and their attributes 104 that remain unchanged between two different environmental states.

Figure 5:
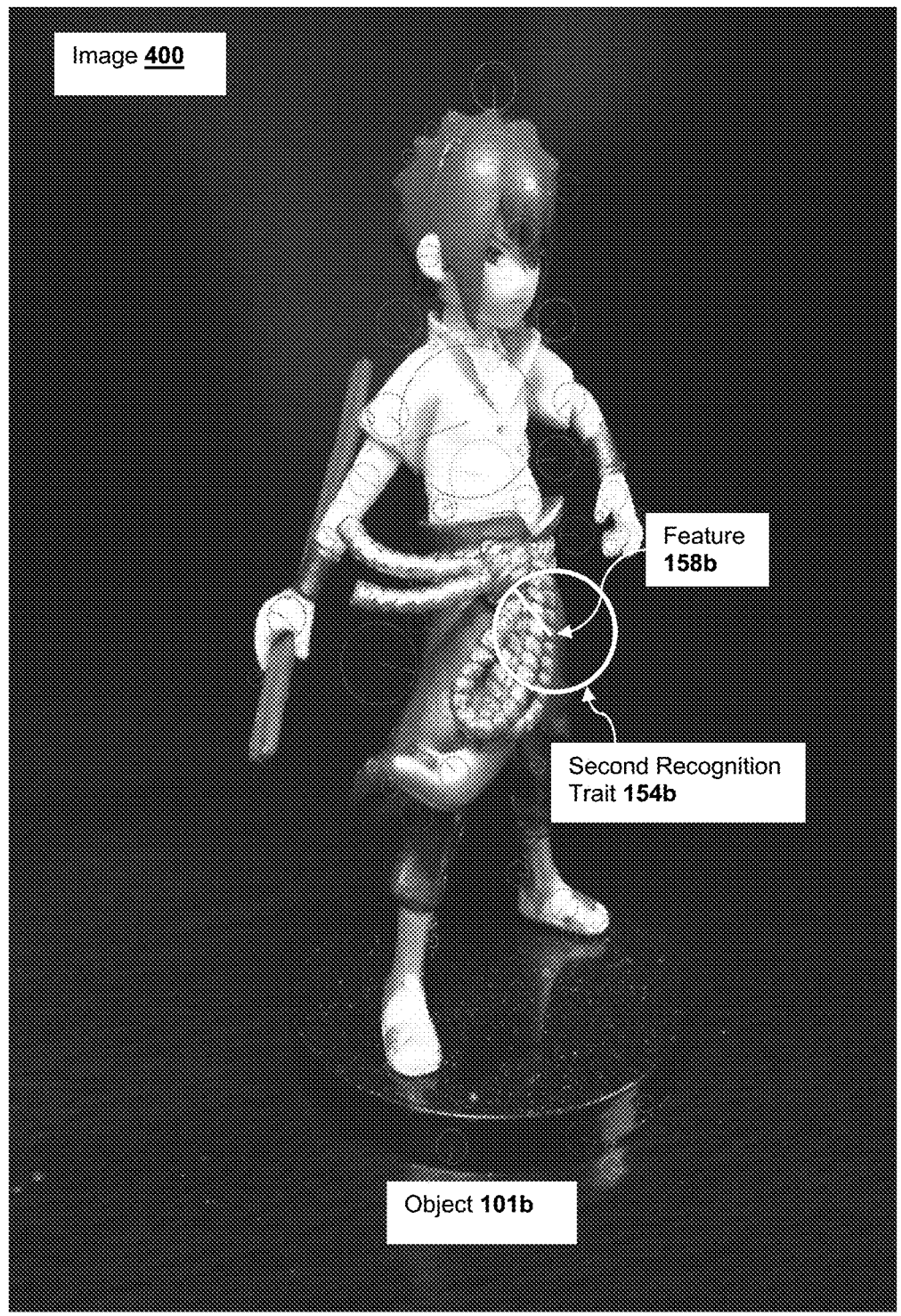
FIG. 5 is the image of FIG. 4 with a second recognition trait highlighted.

FIG. 5 illustrates one example of a second recognition trait 154b, which comprises a plurality of descriptive elements (e.g., descriptors) of a portion of object 101b (e.g., the rope belt on the figurine) that have been derived from the trait extraction algorithm. Via image processing techniques, the trait recognition module 152 can determine the corresponding location within the image 400 of feature 128b, which is the physical feature of object 101 corresponding to feature 128a of image 200 and use the corresponding keypoint and associated descriptor at that location as the second recognition trait 154b. As such, in the illustrative example using figurine 101, the traits 154a and 154b have a correspondence of a same physical location on the figurine (even though their respective (x, y) locations within each of the images 200, 400 are different and their descriptors are different).

The keypoint of second recognition trait 154b is illustrated as a circle with a radial line indicating an orientation in FIG. 5. In the current example, the keypoint of second recognition trait 154b is considered to be located at pixel location (1503, 1552) of image 400. As with first recognition trait 154a, second recognition trait 154b is a 128-dimension SIFT descriptor. In this example, the descriptor of second recognition trait 154a resulting from the trait extraction module 152 is considered to be {8, 0, 0, 0, 0, 1, 3, 49, 4, 0, 0, 0, 6, 14, 8, 24, 28, 0, 0, 0, 2, 5, 16, 140, 8, 0, 0, 0, 14, 30, 42, 85, 8, 0, 1, 3, 3, 2, 3, 36, 63, 3, 0, 7, 12, 6, 3, 24, 140, 13, 0, 0, 0, 3, 36, 140, 29, 3, 0, 0, 36, 140, 100, 69, 2, 0, 3, 16, 4, 0, 2, 17, 54, 8, 1, 10, 4, 2, 24, 44, 140, 140, 0, 0, 0, 3, 7, 22, 68, 140, 12, 9, 82, 70, 9, 10, 6, 0, 0, 4, 3, 1, 3, 66, 4, 1, 0, 0, 4, 29, 43, 81, 20, 139, 5, 1, 17, 40, 8, 2, 9, 140, 87, 25, 18, 2, 0, 0}.

It should be noted that the keypoints and descriptors illustrated within and associated with FIGS. 3B and 5 are representative examples to illustrate their use according to aspects of the inventive subject matter. As such, the visual and data-value representations of these keypoints and descriptors are presented for clarity and are not intended to represent exact values.

Mapping module 160 is configured to identify a mapping 162 that maps the elements of trait 154a and trait 154b to a new representation space. The mapping of the elements in the new representation space satisfies variance criteria among corresponding elements across the first training data set 130a and the second training data set 130b. In some embodiments, the variance criterion is a function of a variance with respect to one or more of the elements. The variance represents how "invariant" the elements are with respect to the adjusted environmental parameter and attribute. For example, a (relatively) large variance means the element is likely not invariant, whereas a (relatively) small variance means that the element is empirically invariant.

Thus, to be able to identify a proper mapping 162 for traits 154a and 154b the mapping module 160 first calculates a variance between the trait 154a and 154b. The variance can be calculated for individual elements common to both the first recognition trait 154a and the second recognition trait 154b or for the recognition traits 154a and 154b as a whole (with aggregated scores or values for each trait calculated from the elements of the traits used to determine the variance).

Continuing with the illustrative example, the descriptors of first recognition trait 154a and 154b, the elements can be considered to be the dimensions of descriptor. To find the variance, the mapping module 160 can compare each dimension (or a pre-defined amount of dimensions at known locations that are less than all of the dimensions) of the first recognition trait 154a descriptor with a corresponding dimension of the second recognition trait 154b descriptor.

For example, the first ten dimensions of the descriptor of trait 154a are {0, 0, 6, 24, 13, 33, 5, 0, 4, 7, . . . } and the first ten dimensions of the descriptor of trait 154b are {8, 0, 0, 0, 0, 1, 3, 49, 4, 0, . . . }. Thus, the mapping module 160 calculates the variance for the corresponding first ten dimensions of the descriptors of trait 154a and 154b as {8, 0, −6, −24, −13, −32, −2, 49, 0, −7, . . . }. It should be noted that the variance for each of the elements can be expressed in terms of a positive or negative value (indicating a magnitude of variance and also direction) or, alternatively, simply be expressed as an absolute value of the variance (indicating a magnitude of variance only).

The module 160 can then determine whether one or more pairs of corresponding elements (in this example, descriptor dimensions) of traits 154a and 154b can be considered to be invariant by applying a trait element invariance criteria to the variance. The trait element invariance criteria can be considered to be the criteria that defines whether a particular trait element is invariant. For example, a trait element invariance criteria can be a threshold variance value for a particular element (or for a trait as a whole) such that a variance of the element from a first trait 154a to a second trait 154b that is greater or equal to the threshold is considered variant. Conversely, a variance of the element of less than the threshold is considered invariant. As the variance represents a change in values, the threshold can comprise solely a magnitude of an element's change (e.g., the absolute value of the variance is considered). The trait element invariance criteria can include threshold variance values that are uniform across all elements or that can differ for one or more of the elements in the traits.

Continuing with the example above, suppose that a trait element invariance criteria includes a variance threshold value of "10" for all of the elements (dimensions) of the traits (in this example, the descriptors). For the variance of the corresponding elements of traits 154a and 154b {8, 0, −6, −24, −13, −32, −2, 49, 0, −7, . . . }, within these first 10 dimensions, the mapping module 160 determines that dimensions 1-3, 7, and 9-10 are invariant (because their respective magnitudes of 8, 0, 6, 2, 0, and 7 are less than the threshold value of 10) and that dimensions 4-6 and 8 are variant (because their respective magnitudes of 24, 13, 32 and 49 are greater than the threshold value of 10).

When module 160 determines that a pair of corresponding elements is invariant, the pair of elements can be ignored (e.g., the data set of elements can be dimensionally reduced) to thereby reduce the computational demand of module 160. Unlike dimensional reduction via principle component analysis, which merely indicates from a statistical perspective which dimensions have greatest or least variance, module 160 empirically identifies or discovers invariant elements by adjusting one or more environmental parameters in a controlled data acquisition (e.g., data sensing) environment. Thus, the disclosed system is able to discover empirical correlations between trait element variants (or lack of variations) with varied environmental properties. In some embodiments only a single environmental parameter 103 and/or attribute 104 is adjusted at a time to produce the second environmental state 102b. By adjusting one environmental attribute 104 at a time, module 160 can produce a more sensitive mapping 162 due to smaller variances between the corresponding elements of the recognition traits 154a and 154b. Controlled sensing environment 110 can be further configured to create a third, fourth, through $n^{th}$ environmental state that has a third, fourth, through $n^{th}$ training data set, each set providing additional variances under known environmental parameter adjustments to empirically identify additional invariant dimensions (e.g., elements of recognition traits) that can be ignored during an image recognition process.

In embodiments, the module 160 can be programmed to, upon detecting a sufficiently large change in the value of the trait 154b (or one or more of its elements) from the value of trait 154a (or one or more of its elements corresponding to those of trait 154b), flag the keypoint in the sensor data (e.g., keypoint in image data) as a candidate for further analysis. Having flagged one or more of these keypoints, the module 160 can be programmed to execute a routine based on this observed variance (dx/dp, and higher-order derivatives) and explore the space around this keypoint (such as via additional variance analysis with corresponding keypoints for the new keypoint in the other images).

In other aspects of some embodiments, the trait element variance criteria may identify a low variance among the corresponding elements in the recognition traits across the first and second training data sets 130a and 130b, where the low variance operates as a function of a low variance threshold. In addition, the trait element variance criteria could further identify a high variance among the corresponding elements in the recognition traits across the first and second training sets 130a and 130b, where the high variance operates as a function of a high variance threshold.

Module 160 is also configured to store mapping 162 in a memory 170. Memory 170 can comprise a non-transitory electronic storage medium, such as a database, hard drive, flash drive, random access memory (RAM), or any other device suitable for electronically storing data.

Mapping 162 can include a dimensionality reduction of the elements. In addition, mapping 162 can represent an invariant property of one of the elements of a recognition trait with respect to adjusted environmental parameters (e.g., one or more of parameters 103b) or adjusted environmental attributes (e.g., one or more of the attributes 104b of parameters 103b). Alternatively, or in addition to the invariant property, mapping 162 can also represent a variant property of one of the recognition trait elements with respect to adjusted environmental parameters.

In some embodiments, mapping 162 can comprise a non-linear mapping from the plurality of elements of first recognition trait 154a and second recognition trait 154b to a plurality of elements in a new multi-dimensional space. For example, when first recognition trait 154a and second recognition trait 154b are corresponding SIFT descriptors, each having 128 dimensions, the new multi-dimensional space could comprise a corresponding SIFT descriptor having only 30 dimensions, the 30 dimensions being the most relevant of the original 128 dimensions with respect to an adjusted environmental parameter or attribute. As another example, mapping 162 could comprise a non-linear mapping that transforms features into a new multi-dimensional space such that linear classification algorithms can be applied with the same level of efficacy as non-linear methods, per the techniques described in "Efficient Additive Kernels via Explicit Feature Maps" published by Vedaldi et al., in IEEE June 2011. In other aspects, such a non-linear mapping could be provided as an optional pre-processing step for an object categorization engine (e.g., engine 620 in FIG. 6).

In yet other aspects, mapping 162 could comprise a linear mapping from the plurality of elements of the first and second recognition traits 154a and 154b to the plurality of elements in a new invariant space. More simply, mapping 162 could comprise a look-up table.

In another aspect of some embodiments, mapping 162 can include an inferred state of a real-world environment based on the new recognition trait (e.g., second recognition trait 156). Viewed from another perspective, mapping 162 can be used to infer an environmental state or condition based on observed traits (e.g., descriptors, etc.). For example, when system 100 is deployed in a mobile smart phone, system 100 can infer one or more aspects of the environmental conditions, such as lighting conditions, view point, camera information, etc. A context can be inferred based on the measured environmental parameters. Based on the context, a corresponding spill tree can be selected fitting the context such that the look-up is performed faster than if the entirety of the spill tree were traversed sequentially.

Figure 6:
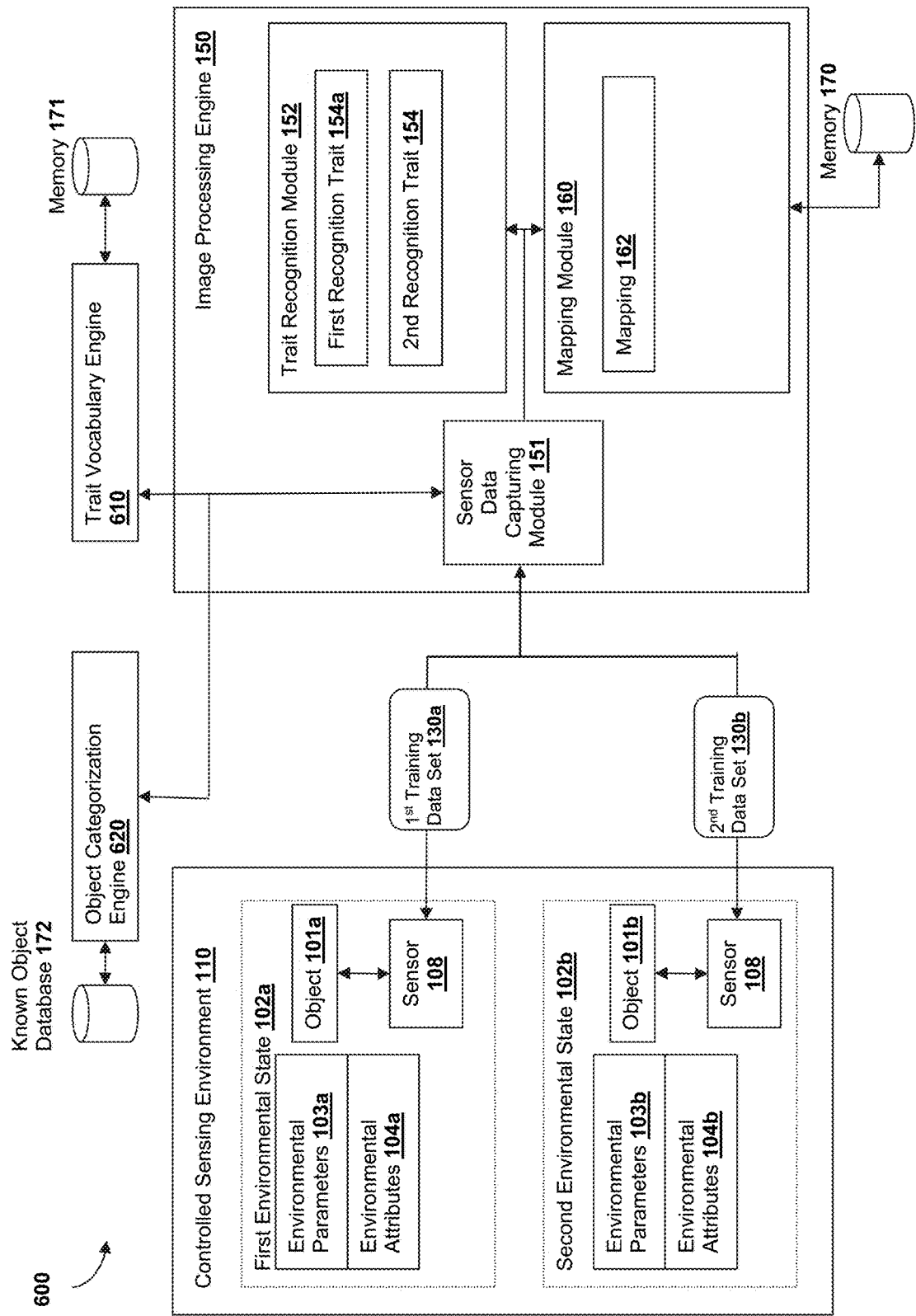
FIG. 6 is a schematic of another embodiment of a sensor data processing system.

FIG. 6 shows a sensor data processing system 600. System 600 is similar to system 100 except that system 600 additionally includes a trait vocabulary engine 610 (and associated memory 171) and an object categorization engine 620 (with associated known-object database 172).

Engine 610 is configured to generate a trait vocabulary as a function of descriptor clusters derived from data set 130*a* and/or data set 130*b*. Engine 610 is also configured to save the trait vocabulary on a memory 171. A trait vocabulary can be considered to be a collection of relevant descriptors, organized into cells and indexed according to identifiers. Suitable techniques for generating the trait vocabulary are discussed in Applicant's U.S. application Ser. No. 14/622,621, entitled "Global Visual Vocabulary, Systems and Methods" and incorporated by reference herein in its entirety. The trait vocabulary can include global vocabularies for specific domains or an overarching universal vocabulary across domains. Thus, it should be noted that the global vocabulary for a particular domain might change whereas the universal vocabulary is likely to remain unchanged, even if new training data is added. Thus, the words in the trait vocabulary for a specific object (e.g., the figurine) might change but the global vocabulary would not.

The trait vocabulary can include a corpus of vocabulary atoms or "words" representing recognition traits (e.g., the trait vocabulary can be a vocabulary of image descriptors). Trait recognition module 152 can use the trait vocabulary to derive recognition trait 154*a* and/or recognition trait 154*b*, in which the elements of traits 154*a* and/or 154*b* comprise atoms of the vocabulary. In addition, one or more elements of a recognition trait may also comprise a distribution/histogram of vocabulary elements occurring in input data (e.g., data set 130*a* and/or data set 130*b*). In this manner, first recognition trait 154*a* and second recognition trait 154*b* will be associated with at least one of the vocabulary atoms or "words".

In addition, mapping module 160 could be further configured to define a new vocabulary when identifying the mapping, such that recognition traits relative to the new vocabulary vary minimally between the two training sets.

In some embodiments, the corpus of vocabulary atoms can include at least one cluster shape trait. For example, the cluster is a group of atoms that represent elements of a recognition trait (e.g., dimensions of a SIFT descriptor) that fall on a manifold (e.g., a surface of a 3D shape). The cluster of vocabulary atoms can include numerous subsets of clusters that fall on multiple manifolds that define subsets of recognition traits. In embodiments, the cluster shape trait can be a distribution fit to the cluster.

System 600 also differs from system 100 in that it includes an object categorization engine 620. Object categorization engine 620 is configured to classify object 101 as a type of object based on at least one of recognition trait 154*a* and recognition trait 154*b*. Engine 620 can be further configured to store the recognition trait 154*a* or recognition trait 154*b* with the type of object in a known object database 172. Database 172 includes a library of known objects and object recognition traits. Database 172 also includes a trait-to-object mapping or correspondence that can be used to train a discriminative or generative classifier (e.g., Random Forests, Support Vector Machines (SVM), Neural Nets, Boosting, etc.). The classifier can then be used in place of database 172 to determine object identity once at least one recognition trait is extracted from an object (e.g., first recognition trait 154*a*).

It should be noted that FIGS. 1 and 6 are merely conceptual representations of system 100 and system 600, respectively, and do not necessarily imply any particular hardware architecture or configuration. For example, those of ordinary skill in the art will appreciate that engine 610 in FIG. 6 could comprise separate hardware and software than engine 150. Alternatively, engine 610 and engine 150 could share resources and engine 610 could even comprise a module within engine 150. In addition, memory 170 and memory 171 could exist on a single device, or could alternatively be distributed together across multiple devices. Various system architectures are possible for system 100 and system 600, which may include distributed processing, LAN-to-WAN networking, virtual databases, cloud computing, cloud storage, and many other configurations. The particular architecture of system 100 and 600 should not be limited to any particular configuration unless specifically stated in the claims or otherwise specifically noted.

It is contemplated that, except for a physical object 101 being sensed, the system 100 (and also system 600) can be incorporated into a single device such as a smartphone or other computing device that includes a sensor 108 such as a camera. As the environmental parameters 103 (and associated attributes 104) dictating an environmental state 102 can include sensor and other device parameters, the controlled environment 110 can be one whereby only parameters (and attributes) associated with the device are those capable of being controlled and modified. In this example, there is a limited amount of control over a particular environment.

In another example, the controlled sensing environment 110 can be a completely controlled environment with respect to the sensor 108, such as a studio whereby all of the lighting parameters, positioning of objects 101 being imaged, appearance of objects 101 being imaged, background imagery (e.g., green screen, completely white or black background, etc.), camera settings, duration of sensor capture, duration of session, and other environmental parameters 103 (both the presence of the environmental parameters 103 themselves within the environment and also the attributes 104 of those parameters 103) can be tightly controlled and modified.

The controlled environment 110 can be considered to include multiple dimensions (e.g., the different environmental parameters 103). As such, at an instant in which an image is captured by an image sensor 108 have corresponding attribute-value pairs that describe the environment 110 (as discussed above, the corresponding pair is the parameter 103-attribute 104 pair that define and describe the instant environmental state 102). Typically, these parameters are considered orthogonal to each other in that a modification of one attribute 104 associated with a parameter 103 does not result in a change in an attribute 104 of another parameter 103. For example, in the illustrative example discussed above a change in lighting does not change the orientation of the object 101. Nevertheless, depending on the type of descriptor used, more than one dimension can be considered correlated in affecting the resulting value of the descriptor (the effect on the descriptor is based on the nature of the particular descriptor). For example, changing two environmental dimensions (i.e. attributes 104 of environmental parameters 103) might affect a SIFT descriptor differently than a DAISY descriptor. In embodiments, the mapping module 160 can be programmed to employ latent variable models (such as factor analysis, latent Dirichlet allocation (LDA), probabilistic latent semantic analysis (pLSA), Gaussian process latent variable models, etc.) to identify these correlations for each descriptor type and then map how the changes differ between the different object recognition algorithms and how they behave under various changes in environmental conditions.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A graphic image processing method using at least one memory and one or more processors in communication with the at least one memory, the method comprising:
   obtaining a sensor data set representative of at least one graphic image, the sensor data set comprising image data obtained from a sensor within an environment having one or more environmental parameters that correspond to one or more environmental attributes;
   deriving a recognition trait comprising a plurality of elements from the sensor data set according to a trait extraction algorithm;
   recognizing a game object as a real-world object by mapping the recognition trait to a game object trait vocabulary in a representation space, wherein the mapping of the plurality of elements in the representation space satisfies trait element variance criteria among corresponding elements in the recognition trait and an associated game object trait mapped to the recognition trait, and comprises an invariant property or a variant property of at least one of the elements of the recognition trait with respect to adjusted environmental parameters or adjusted environmental attributes, and the game object trait vocabulary comprises a plurality of cells each having an image descriptor representing a recognition trait and indexed according to an identifier; and
   classifying the game object or the real-world object based on the recognition trait.

2. The method of claim 1, wherein the game object trait vocabulary is generated based on descriptor clusters derived from at least the sensor data set.

3. The method of claim 1, wherein the one or more environmental parameters include at least one of a duration or length of time, a sampling or analysis frequency, and a distortion of time via slowing down or speeding up sensor data playback.

4. The method of claim 1, wherein the one or more environmental parameters include one or more lighting properties.

5. The method of claim 4, wherein the one or more lighting properties include one or more of light color and background color.

6. The method of claim 1, wherein the one or more environmental parameters include one or more object properties.

7. The method of claim 6, wherein the one or more object properties comprise object color.

8. The method of claim 1, wherein the one or more environmental parameters include at least one of object movement, object direction or object phase.

9. The method of claim 1, wherein the sensor data set comprises accelerometer data.

10. The method of claim 1, wherein the sensor data set comprises video data.

11. The method of claim 10, wherein the one or more environmental parameters include a video frame rate.

12. The method of claim 1, wherein the real-world object comprises a person.

13. The method of claim 1, further comprising classifying the real-world object as a type of object based on the recognition trait.

14. The method of claim 1, further comprising tracking a location of the recognition trait across multiple environmental states.

15. The method of claim 1, wherein the environment comprises a virtual or simulated environment.

16. The method of claim 1, wherein the trait extraction algorithm comprises at least one of an image processing algorithm, a classification algorithm, an object recognition algorithm, and an edge-based recognition technique.

17. The method of claim 16, wherein the image processing algorithm comprises at least one of a SIFT, FAST, FREAK, BRIEF, ORB, BRISK, GLOH, SURF, vSLAM, SLAM, BURST, and DAISY image processing algorithm.

18. The method of claim 1 wherein the recognition trait comprises an image descriptor.

19. The method of claim 18, wherein the plurality of elements comprises dimensions of the image descriptor.

20. The method of claim 1, wherein the recognition trait comprises a cluster of descriptors.

21. The method of claim 1, further comprising classifying the game object as a type of real-world object.

22. The method of claim 1, wherein the mapping defines a new game object trait vocabulary.

23. The method of claim 1, wherein the mapping includes a dimensionality reduction of the plurality of elements associated with the invariant property of one or more elements.

24. A graphic image processing system comprising:
at least one memory storing graphic image processing instructions; and
one or more processors in communication with the at least one memory such that, when executed, the graphic image processing instructions cause the processor to:
obtain a sensor data set representative of at least one graphic image, the sensor data set comprising image data obtained from a sensor within an environment having one or more environmental parameters that correspond to one or more environmental attributes;
derive a recognition trait comprising a plurality of elements from the sensor data set according to a trait extraction algorithm;
recognize the game object as a real-world object by mapping the recognition trait to a game object trait vocabulary in a representation space, wherein the mapping of the plurality of elements in the representation space satisfies trait element variance criteria among corresponding elements in the recognition trait and an associated game object trait mapped to the recognition trait, and comprises an invariant property or a variant property of at least one of the elements of the recognition trait with respect to adjusted environmental parameters or adjusted environmental attributes, and the game object trait vocabulary comprises a plurality of cells each having an image descriptor representing a recognition trait and indexed according to an identifier; and
classify the game object or the real-world object based on the recognition trait.

25. A computer program product embedded in a non-transitory computer-readable medium comprising instructions for graphic image processing, which, when executed, configure one or more processors to perform a method comprising:
obtaining a sensor data set representative of at least one graphic image, the sensor data set comprising image data obtained from a sensor within an environment having one or more environmental parameters that correspond to one or more environmental attributes;
deriving a recognition trait comprising a plurality of elements from the sensor data set according to a trait extraction algorithm;
recognize the game object as a real-world object by mapping the recognition trait to a game object trait vocabulary in a representation space, wherein the mapping of the plurality of elements in the representation space satisfies trait element variance criteria among corresponding elements in the recognition trait and an associated game object trait mapped to the recognition trait, and comprises an invariant property or a variant property of at least one of the elements of the recognition trait with respect to adjusted environmental parameters or adjusted environmental attributes, and the game object trait vocabulary comprises a plurality of cells each having an image descriptor representing a recognition trait and indexed according to an identifier; and
classify the game object or the real-world object based on the recognition trait.

* * * * *